Oct. 25, 1927.

K. SCHMIDT

SPEED REGULATING SYSTEM

Filed Jan. 15, 1924

1,647,020

Inventor
K. Schmidt
By Marks & Clerk
Attys

Patented Oct. 25, 1927.

1,647,020

UNITED STATES PATENT OFFICE.

KARL SCHMIDT, OF BERLIN, GERMANY, ASSIGNOR TO C. LORENZ AKTIENGESELL-SCHAFT, OF BERLIN-TEMPELHOF, GERMANY.

SPEED-REGULATING SYSTEM.

Application filed January 15, 1924, Serial No. 686,432, and in Germany January 13, 1923.

It is known in mechanical engineering to keep the output, or speed, of prime movers constant, by means of centrifugal governors, in which the centrifugal force produced during the rotation of a weight is suitably transferred to stationary parts, for instance by means of levers, and caused to operate the controlling members of the machine. It is also known to operate electric contacts which are caused to act on electric devices. These regulators are based on the utilization of centrifugal force, which, used as the sole force, allows only a rough regulation to be effected so that such speed regulators and more particularly when intended for electric machines, cannot be employed if they have to maintain the output or speed constant within less than 1/100%.

According to the present invention use is made of a new principle which consists therein that two forces are caused to act in the speed regulator. When this principle is applied in practice, it causes the controlling members of the machine to be operated, not impulsively, but gradually, this being due to the fact that in addition to the centrifugal force, which varies with the variation in speed, also the action of gravity which comes intermittently into play, is utilized.

My invention will be more clearly understood from the following specification by reference to the accompanying drawings wherein:—

Figure 1:
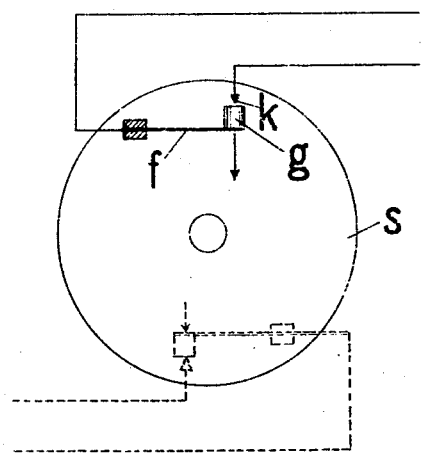
Figure 2:
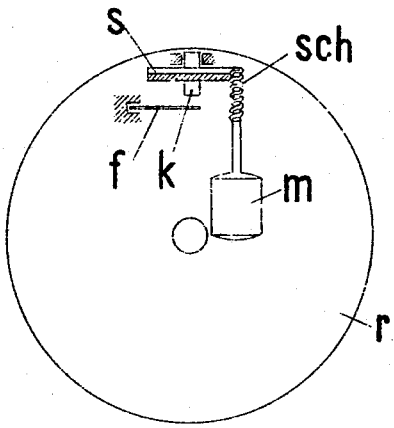
Figure 3:
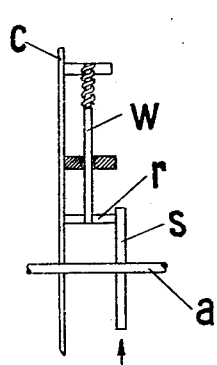
Figure 4:
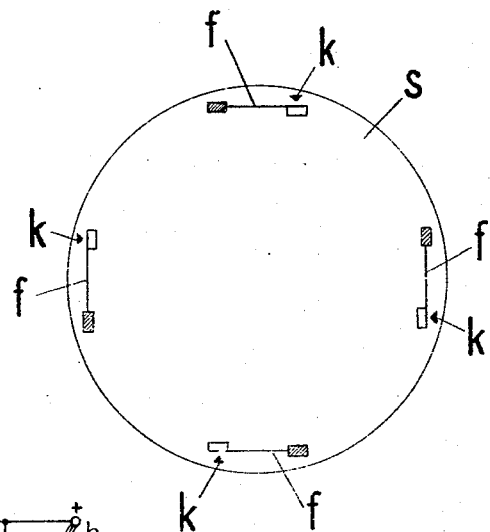
Figure 6:
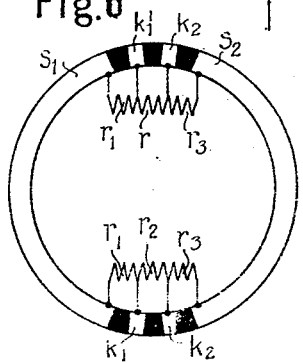
Figure 5:
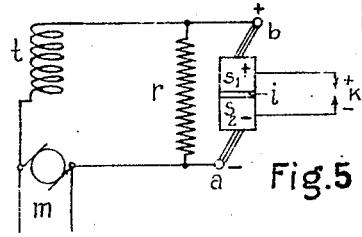

Figure 1 is a diagrammatic illustration of the speed regulator of my invention; Fig. 2 shows the arrangement of contact adjusting device used in the regulator of my invention; Fig. 3 is a side view of the speed regulating device of my invention partially in cross-section; Fig. 4 shows a system of mounting the contact devices on the speed regulator; Fig. 5 is a wiring diagram of one method of connecting the speed regulating device of my invention; and Fig. 6 is a detail view of the commutator associated with the speed regulator of my invention showing the means I provide for avoiding sparking at the commutator segments.

The operation of the regulator will now be described by way of example in connection with the diagrammatic arrangement illustrated in Figure 1.

A spring $f$ loaded with a weight $g$ at a suitable point is mounted near the periphery of a rotating disc $s$. In the form of construction illustrated in this figure the weight has been provided at a point of the spring $f$ where the amplitude of oscillation of the latter is a maximum, the weight acting as a contact that co-operates with the contact $k$. When the disc $s$ runs at such a speed that an electric circuit (indicated in the drawing) is closed through the contacts $g$, $k$, this circuit will be continuously closed and interrupted in such a manner that its closing and opening will be effected once during each revolution of the disc. If the disc is operated in a vertical position, in the position shown in full lines, the circuit will be open, and in the position indicated in dotted lines, it will be closed, as in the latter case the centrifugal force is assisted by gravity, viz the weight of the spring, minus the tension of the latter.

In the position shown in full lines, the weight of the spring is subtracted from the centrifugal force so that the contact is open. The time during which contact is made, and accordingly the duration of the current that acts upon the driving machine, is dependent upon the speed. As the direction of bending of the spring varies once during each revolution so that a current impulse is produced, the natural frequency of the spring must be substantially greater as compared with the number of revolutions, for which reason the spring preferably consists of a clamped piece of steel or of a membrane.

The new essential feature of the invention as described is that contacts $g$ and $k$ not only are operated by one force, the centrifugal force, as is the case in all similar regulators heretofore known, but by the coaction of two forces, namely, of said centrifugal force having a constant value, and the gravity force of the weight which acts periodically. In this way contact is made once each revolution. The influence of the centrifugal force is not the making of a contact at all, but the control of the duration during which the contact is closed. The contacts may operate to short-circuit a resistance inserted in the shunt winding of a D. C. motor as a prime mover. If this resistance is duly adjusted the exciting current when the speed varies will be influenced as the duration of contact making varies also with the speed in such a way as to restore the original speed instantaneously, the action of the back-electromotive force of the shunt winding due to its inductance being practically cut out, whilst when the regulator works according to methods heretofore known, that is, only by means of the centrifugal force, the speed will be regulated in a shock-like manner within relatively great intervals. With the regulator according to the invention the speed of high frequency machines has been maintained constant with such an accuracy that in connection with static frequency changers, waves down to 280 meters wavelength have been attained with an extreme constancy of the wave length.

Another characteristic feature of the invention is, that the regulator will only act when the regulator disc rotates in a vertical plane.

When at rest, the speed regulator may be adjusted to a predetermined speed, by varying the distance between the contacts. This, however, is a drawback as the speed cannot be regulated also during its operation.

A further object of the invention is to provide means which will enable the regulator to be adjusted to any desired speed also during its operation. This is attained by making the contact so as to be capable of adjustment during the running of the regulator, for instance, by providing as near as possible to the centre of the regulating disc, an electrical or mechanical adjusting device, which varies the distance between the contacts through the intermediary of a gear. Figure 2 illustrates by way of example, such a form of construction. $r$ is a regulator disc provided at its periphery with a regulating spring $f$, the end of which makes contact with the contact $k$ when the spring is bending. This contact is adjusted according to requirements, by means of a screw which terminates in a toothed wheel operated by means of a pinion S mounted on the end of the shaft of a small motor $m$. The current is supplied to the motor through three slip rings. Preferably, use is made of an electric motor with permanent magnets, as in that case only two slip rings are required to allow the motor to run in both directions.

The distance between the contacts may also be varied mechanically during the operation. For this purpose a disc is loosely mounted on the same shaft on which the regulator disc is mounted, that is to say, in such a manner that it can rotate thereon. This disc rotates at the same speed as the regulator disc, and if a brake is applied thereto, a differential speed is obtained between the two discs, which is used for varying the distance between the contacts. Such a form of construction is illustrated in Figure 3, by way of example.

Referring to Figure 3, $c$ is the regulator disc which is mounted on the spindle $a$ of a prime mover. Near the centre there is provided a friction disc $r$ on a shaft $w$ terminating in a screw, which operates a toothed wheel acting upon the adjustable contact. The friction wheel $r$ lies on the one hand against the regulator disc $c$ and on the other hand against a disc $s$ which is loosely mounted on the shaft. When the shaft rotates, the loosely mounted disc, the weight of which is to be kept as small as possible, is taken along and the friction wheel remains stationary. However, if a brake is applied to the disc, mechanically or electrically, a differential speed is produced between $c$ and $s$, as a result of which, the friction wheel $r$ is rotated and the contact can be adjusted or the speed varied.

According to the invention the regulator may be adjusted during its rotation to different speeds in a different manner, viz by providing on the disc a number of springs, which are adjusted or tuned to the desired values. Figure 4 illustrates such an arrangement by way of example.

Referring to Figure 4, $s$ is the disc on which four springs are mounted near its edge. The spring $f$ may for instance consist of a steel band which is clamped at one end and bends outwards during the rotation of the disc, until it strikes against the opposite contact $k$. The springs may be adjusted or tuned according to the corresponding speed. This may be effected in three different ways. For instance the springs may be made to possess different weights, or the dimensions of the springs may be made different, or the distances between the springs and contacts may be adjusted to be different. Each contact is connected to a separate slip ring which is connected with the regulating device of the motor.

If the rotating contacts are inserted in a circuit carrying continuous current, one side thereof may wear off owing to the arc that is produced, which would be detrimental to the continuous maintenance of a good contact. In order to avoid this drawback, according to the invention the continuous current to be supplied to the rotating contacts is converted into alternating current, for instance, by means of a device, such as a commutator embodying the contacts. Such an arrangement is illustrated in Figure 5, diagrammatically and by way of example.

Referring to Figure 5, the continuous current is supplied from the machine $m$ and through the brushes $a$ and $b$ to the halves $s_1$ and $s_2$ of the slip ring, which are separated from one another by a suitable insulation $i$, whereby the contact connected to $s_1$ and $s_2$ receives alternating current. A further advantage of this arrangement lies in the use of a single slip ring, which is a more simple construction.

The voltage between the two segments of the commutator being high, sparking is produced at the insulation when the brushes pass over from one segment to the other, in consequence of which the insulation, and the slip rings become burnt at this place, in time.

A further feature of the invention consists therein that the sparking is entirely avoided by bridging the commutator segments $s_1$ $s_2$ (see Fig. 6) by means of suitable resistances $r_1$, $r_2$, $r_3$, which are rigidly connected therewith. The segments $k_1$ and $k_2$ are mounted in an insulated manner between the segments $s_1$ and $s_2$, the said segments $k_1$, $k_2$ being connected to $r_1$, $r_2$. During the rotation the brushes $a$ and $b$ whilst passing from $s_1$ to $s_2$ go over the intermediate segments $k_1$ and $k_2$, whereby the commutation is caused to be effected gradually, and the sparking is avoided.

What I claim is:—

1. A speed regulator for an electric motor comprising a rotating disk, a contact supported by said disk, a resilient member mounted thereon, a contact carried by said resilient member, and arranged to be opened and closed with respect to said contact supported by said disk, said resilient member being arranged for effecting contact once for each revolution of said disk, the frequency of closing and opening of said contact being directly dependent upon the speed.

2. A speed regulator for an electric motor comprising a disk arranged to rotate in a vertical plane, a contact mounted on said disk, a spring having a natural frequency substantially greater than a predetermined number of revolutions of said disk mounted on said disk and loaded with a weight at its free end, and adapted for closing and opening said contact, said weight and spring being adapted to make contact once during each revolution of said disk, the frequency of said closing and opening of the contacts being directly dependent upon the speed.

3. A speed regulator for an electric motor comprising a disk arranged to rotate in a vertical plane, a contact mounted on said disk, a spring having a natural frequency substantially greater than a predetermined number of revolutions of said disk mounted on said disk and loaded with a weight at its free end, and adapted for closing and opening said contact, said weight and spring being adapted to make contact once during each revolution of said disk, the frequency of said closing and opening of the contacts being directly dependent upon the speed, and automatically revolvable means carried by said disk for varying the distance between said contacts.

4. A speed regulator for an electric motor comprising a disk rotating in a vertical plane, a contact mounted on said disk, a spring having a natural frequency substantially greater than a predetermined number of revolutions of said disk mounted on said disk, and loaded with a weight at its free end and adapted for closing and opening said contact on said rotating disk, said weight and spring being adapted to make contact once during each revolution of said disk, the frequency of said closing and opening of the contacts being directly dependent upon the speed, and an electric motor mounted on said rotating disk and adapted to vary the distance between said contacts during the rotation of the disk.

5. In a speed regulating device for an electric motor, a shaft member, a disk rotatable in a vertical plane with respect to said shaft member, a plurality of contacts supported on said disk, a plurality of springs mounted on said disk, said springs having natural frequencies greater than a predetermined speed of revolution of said disk, said springs being loaded with weights at their free ends, and adapted for closing and opening said contacts on said rotating disk, the weights and the distances of the contacts being adjusted to predetermined different values for completing contact once for each revolution of said disk, the frequency of the closing and opening of the contacts being directly dependent upon the speed, and means for rendering different pairs of contacts effective in succession during the rotation of the disk.

In testimony whereof I have signed my name to this specification.

K. SCHMIDT.